Jan. 26, 1932.      C. H. STERLING      1,843,071
OVERSPEED REAR AXLE
Filed Dec. 24, 1926

Inventor
Claude H. Sterling
By Blackmore, Spencer & Hind
Attorneys

Patented Jan. 26, 1932

1,843,071

UNITED STATES PATENT OFFICE

CLAUDE H. STERLING, OF DETROIT, MICHIGAN, ASSIGNOR TO GENERAL MOTORS CORPORATION, OF DETROIT, MICHIGAN, A CORPORATION OF DELAWARE

OVERSPEED REAR AXLE

Application filed December 24, 1926. Serial No. 156,869.

This invention relates to gearing. The invention is intended for use on motor vehicles and preferably in connection with the pinion shaft at the rear axle.

The invention has among its objects the provision of an overgear drive, second a comparatively simple construction for the over-gear drive and third the use of a more favorable driving ratio between the ring gear and the driving pinion. Other objects and advantages will be understood from the reading of the following specification and examination of the accompanying drawings.

Figure 1:
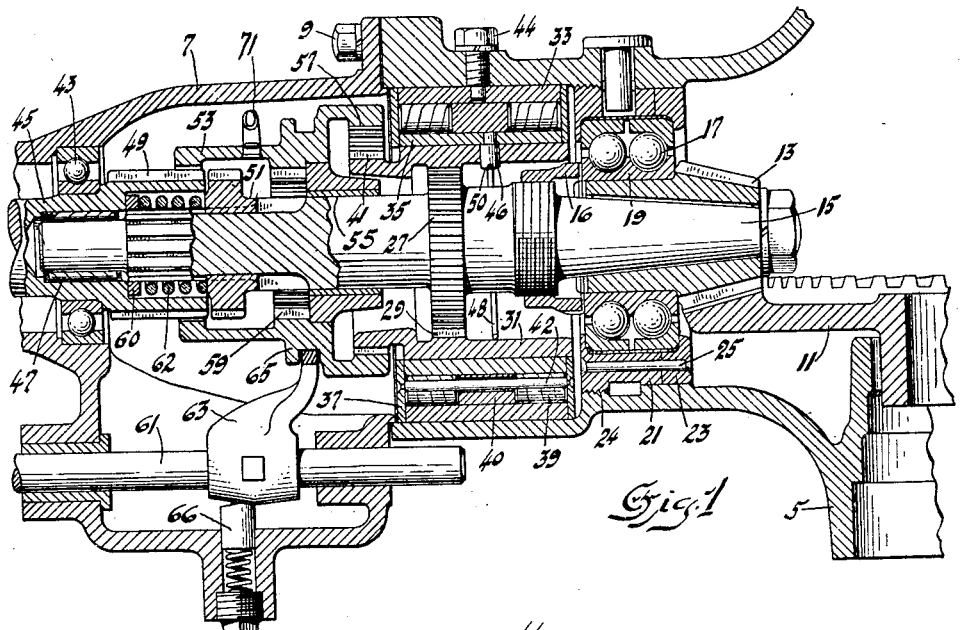
Figure 1 is a horizontal section through the propeller shaft housing and the adjacent portion of the rear axle housing.

Referring by reference characters to the drawings, numeral 5 represents the rear axle housing and numeral 7 is a part of the propeller shaft housing, the housing members 5 and 7 being united by fastening means 9.

Within the axle housing is seen the usual ring gear 11 for driving the differential and live axles. The pinion at 13 is carried on shaft 15 suitably journalled by bearings 17. The inner race 19 is held between the shoulder at the base of the pinion and a sleeve 16 adjustably threaded on the pinion shaft. The outer race is held by a member formed in two parts 21 and 23 united by fastening means 25, adjustment being obtained by a threaded connection with the axle housing as shown at 24.

On shaft 15 is an external gear 27 engaging an internal gear 29 formed on ring 31, the latter mounted for rotation eccentrically with reference to the axis of shaft 15. The drawings show inner and outer races 33 and 35 respectively and bearing retainers 37 for bearings 39, a spacer 40 being shown positioned between the bearings. The retainers 37 are connected by pins 42, which pins 42 extend through the long spacers 40 and pass between adjustable rollers. The pins 42 are thus maintained in parallelism and give rigidity to the bearing as a whole. The bearing is obviously useful elsewhere and is not being specifically claimed herein.

For positioning the outer bearing ring longitudinally a fastening pin 44 is extended through the housing and into the ring 33. Pins 46 may be used to hold the inner bearing ring and the ring member 31 from movement. To prevent the escape of these pins 46 split spring ring 48 is used. This ring encircles the inner wall of the ring member 31 and engages slots 50 in the heads of the pins 46.

Ring member 31 at its forward end is slightly reduced in diameter and its outer surface is formed with teeth constituting an external gear 41.

Within the rear end of the propeller shaft housing is a bearing 43 for the enlarged end of the propeller shaft 45. The reduced forward end of the pinion shaft is rotatably mounted by means of bearings 47 in the open end of the propeller shaft. The extreme rear end of the propeller shaft is formed with splines 49. Non-rotatably mounted on the pinion shaft is a radial tooth clutch 51 having teeth of the same diameter and outline as the splines 49.

Engaging a shoulder within the recessed end of the propeller shaft is a spring abutment 60 and between it and the clutch 51 is a coil spring 62. It will be observed that a little clearance is allowed between the end of the propeller shaft and the clutch 51. This is provided to permit a longitudinal axial movement of the pinion shaft to the left in Figure 1 for the purpose of adjusting the pinion 13 relative to the ring gear. To prevent clutch 51 from engaging the end of the propeller shaft and causing noise the spring 62 is used to hold it at all times firmly against the shoulder of the pinion shaft and away from the end of the propeller shaft. Whenever it may be necessary to adjust the pinion shaft to the right the spring expands slightly to still maintain the clutch 51 firmly against the shoulder of the pinion shaft.

A reciprocating ring gear 53 has at one end internal teeth slidably engaging the splines 49. This ring gear 53 has a sliding engagement at 55 with the pinion shaft. Its rear end has an over-hanging internal gear at 57 for engagement at times with gear 41. The ring gear 53 is provided with internal clutch teeth 59 for engagement with clutch 51. It should be observed that, when in the act of shifting gears the clutch members 59 and 51 are to be engaged, the spring 62 will allow a limited axial yielding movement of clutch 51 under the pressure being applied to effect the clutch engagement, until the clutch teeth are in a circumferential position to properly engage.

Figure 2:
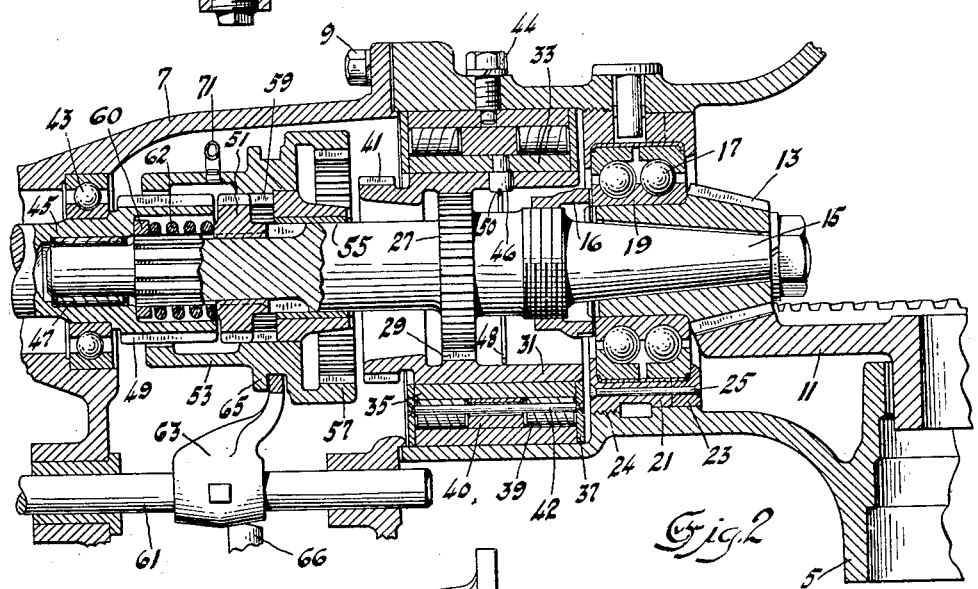
Figure 2 is a similar view showing the parts in a different relative position.
Figure 3:
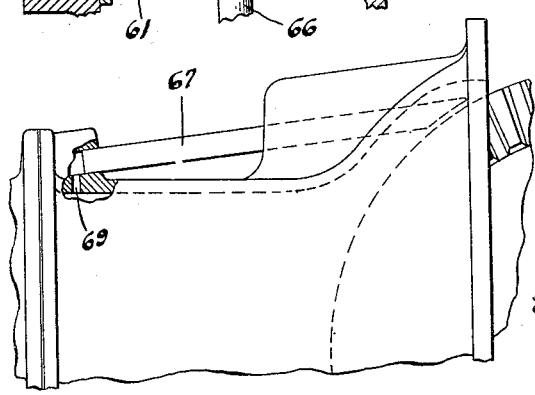
Figure 3 is a side elevation.

The propeller shaft housing is provided with apertures for a sliding rod 61 carrying a shifting fork 63 engaging a collar 65 on the ring gear 53. Any preferred means may be employed for actuating this rod. If desired the rod may be extended forwardly and its movement obtained by a connection with the usual transmission shift lever. A spring detent is shown at 66 the end of which is shaped to yieldingly hold the hub of the shifting fork in both positions of adjustment, these two positions being shown by Figures 1 and 2.

In order to lubricate moving parts within this rear end of the propeller shaft housing a pipe 67 may be used to connect the upper portion of the differential housing with a suitable opening at 69 in the propeller shaft housing. The ring gear 53 may if desired be provided with a scoop 71 which is to collect oil and carry it within the ring gear 53 and the ring member 31. Surplus oil will find its way back to the differential housing through the bearings.

The operation of the device will be readily understood. When the parts are moved to the position shown by Figure 2 the clutch members 59 and 51 are in engagement. Since ring gear 53 is non-rotatably mounted on the propeller shaft through the spline connection at 49 and is directly clutched to the pinion shaft at 51 a direct drive is thus obtained from the propeller shaft through the pinion shaft. Under these circumstances the ring member 31 is being idly rotated through the gearing elements 27 and 29. When the parts are moved to the position shown in Figure 1 the ring gear 53, still rotating with the propeller shaft drives the ring member 31 at a somewhat higher speed than the propeller shaft through the external-internal gear constituted by gear elements 57 and 41. A still further step-up between the ring member 31 and the pinion shaft is obtained by the gearing elements 29 and 27. With the parts in this position it will be seen that the pinion shaft is driven at a speed above that of the propeller shaft through the means of two external-internal gear trains the number of teeth in the two gears of each train being so nearly alike that the over-gear is a very silent drive.

I claim:

In a transmission for vehicles, aligned shafts, one shaft having its end telescoping in the adjacent end of the other shaft, a clutch member slidable but not rotatably mounted on said first named shaft adjacent the end of said second named shaft, resilient means within the open end of said second named shaft engaging said clutch member to hold it in a predetermined position on its shaft, the spring serving as an anti-rattling means and aiding in effecting clutch engagement.

In testimony whereof I affix my signature.

C. H. STERLING.